United States Patent Office 3,466,267
Patented Sept. 9, 1969

3,466,267
TERPENE RESIN COMPOSITIONS
John M. Derfer, Jacksonville, Fla., assignor, by mesne assignments, to SCM Corporation, New York, N.Y., a corporation of New York
No Drawing. Filed Feb. 14, 1966, Ser. No. 527,045
Int. Cl. C08f *17/00*
U.S. Cl. 260—80.7    10 Claims

ABSTRACT OF THE DISCLOSURE

The invention provides a resin composition consisting essentially of polymerized unsaturated hydrocarbon diene units of:
(a) A mixture of dipentene and carvestrene in a dipentene-carvestrene weight ratio of between about 1:0.66 and about 1:10, and
(b) From about 0 to about 90% of a hydrocarbon selected from the group consisting of β-pinene, piperylene, and mixtures thereof.
The preparation of the novel resins is described.
The invention is advantageous in that it provides economical thermoplastic polymers having high softening points (e.g., above 120° C.).

---

The present invention relates to a novel resin composition and more particularly relates to a resin containing polymerized, unsaturated hydrocarbon units.

The invention is advantageous in that it provides high melting, thermoplastic resins which are chemically inert, resistant to acids and alkalies, are pale in color, and are generally stable to light. The resin compositions are useful as tackifying and reinforcing agents in pressure sensitive and hot melt adhesive formulations, as plasticizers and dispersants in rubber compounding, as gloss enhancers in paint, as well as in ink, calking compounds, and the like.

The present invention provides a composition consisting essentially of polymerized, unsaturated hydrocarbon diene units comprising:
(a) A mixture of dipentene and carvestrene in a dipentene-carvestrene weight ratio of between about 1:0.66 and about 1:10, and
(b) From about 0 to about 90 weight percent of a hydrocarbon selected from the group consisting of β-pinene, piperylene, and mixtures thereof.

The term "dipentene" as used herein is intended to mean and to refer to d-limonene, l-limonene, and mixtures thereof. The dipentene can be racemic (e.g. it can contain equimolecular quantities of d- and l-limonene) or it can be non-racemic (e.g. it can be a mixture of the d- and l- forms wherein either of one isomer is present in a predominant quantity over the other isomer).

The term "carvestrene" as used herein is intended to mean and to refer to d-sylvestrene, l-sylvestrene or mixtures thereof. The carvestrene can be racemic (e.g. it can contain equimolecular quantities of d- and l-sylvestrene) or it can be non-racemic (e.g. it can contain a mixture of the d- and l-isomers wherein either of one form is present in a predominant quantity over the other).

The unsaturated hydrocarbon units dipentene and carvestrene are, prior to polymerization, monocyclic dienes; that is, the hydrocarbons have two carbon-carbon unsaturation linkages within their molecules. β-Pinene is a mono-unsaturated bicyclic hydrocarbon and piperylene is an acyclic diene hydrocarbon.

The resin composition may be readily prepared by reacting certain hereinafter-defined feed stocks comprising the unsaturated hydrocarbon unit components within the above defined weight ratio and percentage ranges, in the presence of conventional Friedel-Crafts catalysts. The feed stocks comprise mixtures of dipentene and carvestrene, and when desired, β-pinene and piperylene may be added thereto in the ranges above set forth.

The feed stocks (comprising dipentene and carvestrene mixtures) are obtainable from both petrochemical and botanical sources. Petroleum sources include, for example, process streams employed and/or obtained in the manufacture of isoprene. Such streams comprise unsaturated hydrocarbons and usually have a boiling point range of from about 40° C. to about 180° C. at atmospheric pressure. When distilled, for example, through a ten theoretical plate still at atmospheric pressure or slightly below, the bottoms cut will usually have a boiling point range of about 145°–180° C. and will contain dipentene and carvestrene in a weight ratio in the range of from about 1:0.66 to about 1:1. Such bottoms cut feed stocks also contain substituted cyclo-hexenes and substituted cyclo-octadienes and the dipentene-carvestrene mixture can be directly polymerized (by Friedel-Crafts polymerization) from the feed stock in which case the octadienes remain unpolymerized and the resin will contain small quantities of polymerized cyclo-hexenes. Alternatively, the dipentene-carvestrene mixture can be separated from the cyclo-hexenes and octadienes by conventional distillation and a feed stock consisting substantially of a mixture of dipentene-carvestrene can be readily obtained.

It has also been possible to obtain suitable dipentene-carvestrene feed stocks by heating the heads-cut obtained from the distillation of the above-mentioned process stream at a temperature at or below its boiling point. The heads-cut (prior to heating) has a boiling range of between 34° and 35° C. and consists substantially of isoprene. Upon heating, the heads-cut dimerizes to form a dipentene-carvestrene feed stock which usually contains dipentene and carvestrene in a weight ratio of from 1:1 to 1:10.

As afore-noted, dipentene-carvestrene feed stocks may be also derived from botanical sources such as, for example, from fractions of turpentine obtained from treating pine wood. Particularly useful feed stocks are those obtained by pyrolyzing carene, a terpene hydrocarbon obtained from turpentine. Carene exists in four isomeric forms (e.g. Δ-3-carene and Δ-4-carene and their respective optical isomers). Any one of these isomers or mixtures thereof can be readily pyrolyzed to obtain a dipentene-carvestrene feed stock having a dipentene-carvestrene weight ratio of from 1:1 to about 1:10, usually 1:1 to about 1:2, depending upon pyrolysis conditions hereinafter described.

To obtain the dipentene-carvestrene feed stock from carene, the carene is pyrolyzed preferably in vapor form over a catalyst bed consisting of $Al_2O_3$, preferably activated $Al_2O_3$. The catalyst bed is maintained at a tempertaure in the range of from about 50° to about 500° C., preferably between about 200° to about 300° C. The contact time of the carene with the catalyst generally depends upon the temperature and properties of the catalyst bed. Usually a contact time of from about 0.5 second to 5.0 minutes is sufficient to effect pyrolysis and to form a pyrolyzate (e.g. an isomerizate) which constitutes the dipentent-carvestrene feed stock. By adding small amounts of a pola rsubstance such as HCl or steam to the carene prior to contacting it with the catalyst, the contact time and temperature can be reduced and the dipentent-carvestrene weight ratio will fall within the 1:1 and 1:2 weight ratio. An example of the preparation of a specific carene pyrolyzate is set forth in Example 1.

As will be evident hereinafter, the above described dipentene-carvestrene feed stocks can be polymerized to form resins falling within the scope of this invention.

However, it has been sometimes found desirable to add hydrocarbons such as β-pinene and/or piperylene to the dipentene-carvestrene feed stocks (in amounts within the ranges above described), particularly where a resin having a softening point above about 120° C. is desired.

In the past, resins used as tackifying and reinforcing agents in adhesive formulations have consisted substantially of poly β-pinene since the β-pinene (monomer) can be readily polymerized to provide a resin having the desired softening point and other physical and chemical properties hereinbefore referred to. However, poly-β-pinene has certain disadvantages in that it is expensive and moreover is often in short supply in contrast to the dipentene-carvestrene resins which are relatively inexpensive since dipentene and carvestrene are more abundant.

Where the dipentene-carvestrene feed stock has a weight ratio of less than about 1:0.66 (e.g. for example, 1:05), a resin having a low softening point (below 100° C.) will usually be obtained in poor yields. Where the dipentene-carvestrene weight ratio is above about 1:10 (e.g. 1:15), the softening point of the resin will also often be below that which is desired and the resin yields will also be decreased.

When employed in the resins, the amount of β-pinene in the feed stock is usually in the range of from about 25 to about 75 weight percent, basis the weight of the resin composition. If less than about 25 weight percent of β-pinene is employed, the softening point of the resin will not be materially increased. On the other hand, if more than about 75 percent of β-pinene is employed, the economic advantages of the resin will be minimized.

The resins of this invention may also contain from about 10 to about 50 percent by weight of piperylene. When this hydrocarbon is used, if less than about 10 percent by weight of piperylene is employed, the resins will, surprisingly, have an undesirably low softening point. If more than about 50 percent by weight of the resin is employed, softening points will be lowered and the resin yields from the polymerization will be uneconomically low.

The monomer components which are polymerized to form the resins of this invention are, with the exception of piperylene, $C_{10}$ hydrocarbon monomers and all, including piperylene, are characterized in having carbon to carbon (e.g. ethylenic), unsaturation within their molecules.

Polymerization of the mixture of hydrocarbons to produce the resins of this invention is brought about by treatment with a Friedel-Crafts catalyst; for example, the catalyst described in U.S. Patent 1,836,629. Such catalysts include aluminum chloride, boron trifluoride, fuming sulfuric acid, and the like. Boron trifluoride is particularly suitable in instances where a volatile catalyst is desired, since it is readily released by the resin formed and it is also easily handled because of its gaseous nature. However, other fluorides of boron such as hydrofluoboric acid, dihydroxy fluoboric acid; organo-boron fluoride complexes, as for example, with acetic acid and the like are suitable in providing resins which are substantially free of catalyst residue.

As previously noted, the hydrocarbon feed stock consists substantially of monomeric dipentene, carvestrene, or, if desired, piperylene and/or β-pinene. Polymerization is carried out by merely adding the catalyst to cold monomer mixture. However, the mixture, after the catalyst has been added, reacts exothermically and with such speed as to render temperature control of the viscous solid mass very difficult even when the monomer mixture is prechilled almost to its freezing point. A reaction diluent provides effective temperature control.

The reaction diluent employed will be a liquid which is inert with respect to the hydrocarbon monomers, that is, it will be substantially unreactive therewith and it will not polymerize to form a resin under the conditions of the reaction. The diluent will usually be a solvent for the polymerized catalyst and preferably will dissolve the resins and hydrocarbon monomers. However, solvent action on the resin is not necessary. The reaction solvent usually maintains a reaction mixture as a workable dispersion, i.e. a solution, soft gel, or slurry; and it aids in temperature regulation. Thus a diluent which is liquid at the reaction temperature employed will generally be chosen.

Suitable solvents which have been found to be inert with respect to the monomers are, for example, benzene, toluene, para-cymene, pentane, hexane, heptane, octane, petroleum ether, cyclohexane, methylcyclohexane and halogenated hydrocarbons such as methyl-chloride, methyl bromide, methyl iodide, methylene dichloride, methylene dibromide, chloroform, ethyl chloride, ethyl bromide, ethylene dichloride, ethylidene dichloride, 1,2,2-trichloroethylene and similar halogenated ethanes, propanes, butanes, etc. The two types of solvents (e.g. hydrocarbon and halohydrocarbon) behave differently in the polymerized reaction. Chlorinated solvents, liquid at temperatures below 0° C. and of the character mentioned aid in the formation of resins having high melting points. They require less catalyst. Their solvent action upon the resin formed is limited; solidification or gelation of the reaction mixture dispersion occurs when they are used. The hydrocarbon solvents, especially benzene, toluene and xylene, usually maintain the reaction in the form of a fluid solution which simplifies manipulation. The process permits avoidance of chlorinated solvents even at temperatures of −20° C. and lower to form hard, light colored resins. The polymerization reaction is preferably carried out at very low temperatures.

The hard, substantially colorless, clear, stable resin of high melting point and high molecular weight which represents the product of this invention in its most desirable form is obtained by conducting the polymerization at temperatures below about 0° C. The temperatures are usually held at below −20° C. and in certain instances the reaction may be conducted at temperatures as low as −150° C. The process may be carried out at any low temperature above that at which the particular reaction mixture employed freezes to a solid mass. However, it may be conducted at temperatures above 0° C. and as high as about 180° C., but resins formed at relatively high temperatures are less desirable than those formed at lower temperatures because of lower softening point and increased color of the resin. The reaction may be brought about by forming a solution, preferably saturated, of catalysts such as boron trifluoride in the dilutent and adding the monomer mixture slowly thereto. Alternatively, the catalysts may be added to a monomer solution. For example, boron trifluoride may be advantageously introduced by bubbling it into a solution of the monomer mixture until no more catalyst is absorbed by the solution.

The reaction is quite rapid and may in some instances be substantially instantaneous. Furthermore, the reaction is always exothermic. Since appreciable rise in temperature is generally undesirable, pre-cooling of the reaction mixture components, external cooling of the mixture, vigorous agitation, and slow mixing of the monomer and catalyst are usually preferred practices.

Upon completion of the reaction, the catalyst is removed from the formed resin by washing with water. Where polymerization is carried out (in the preferred manner) at temperatures well below 0° C., it is desirable to inactivate the catalyst with an alcohol such as ethyl alcohol at a low temperature and warm the mixture to above about 0° C. followed by the aforementioned water wash. The alcohol in such cases will be added in an amount insufficient to precipitate the resin. Precipitation of the resin by the addition of a non-solvent can also bring about separation of the resin from the catalyst. However, water washing, usually followed by washing with dilute aqueous alkali (e.g. sodium or potassium hydroxide, carbonate or the like) is preferred for removing the catalyst. The solution, containing the resin and solvent, can be treated and passed through a bed of fuller's earth, filter cell, or other activated or inactivatde absorbent earth, activated carbon, silica gell, activated alumina or the like, to remove traces of materials which are likely to form color in the resin. The resin may be utilized in solution or it may be recovered from the reaction medium by evaporation of the associated volatile solvent preferably at reduced pressure. When so recovered, it will be in the form of a glassy, hard, resin. However, the resin can advantageously be reacted by precipitation brought about by the addition of a non-solvent such as alcohol, dioxane, acetone, methyl ethyl ketone, and the like to a solution of the resin. Recovered in this manner, the product is a whitish granular powder in an especially uniform, colorless, pure material, free of unreacted or partially polymerized resin. Where the solution is not completely soluble in the reaction mixture, the resin is preferably dissolved by adding solvent. The yield of resin obtained may be as high as about 90% by weight of the original monomer mixture and will depend to some extent on the particular feed stock (e.g., monomer mixture) which is employed.

When prepared in small batches, yields may decrease. However, when properly prepared, high yields of resins usually in excess of 80%, based on the amount of feed stock, are obtained.

The resins of the present invention are characterized by having at most a slight color and by being substantially colorless when made under the preferred conditions hereinbefore described. Generally, the resins will have a color of less than N on the resin scale (U.S. Department Agriculture Standard Glass Rosin Color Scale). Where polymerization is carried out under preferred conditions of below 0° C., the color will usually be less than X on the rosin scale and will be substantially as colorless as water. The resins are hard and will be characterized by a drop melting point (ring and ball method) above about 120° C., usually in excess of 130° C. when they are made from feed stocks containing $\beta$-pinene and/or piperylene.

The molecular weight of the resins usually will be above 1000 as determined by the depression of the freezing point of a benzene solution. The viscosity of a 1% solution in benzene or toluene will usually be at least 1.05 times the viscosity of the solvent alone. The resins are soluble in benzene, toluene, xylene, gasoline, ethyl ether, butyl stearate. They are partly soluble in dry oils such as tung oil, lineseed oil and in ethylene dichloride. They are substantially insoluble in alcohol, low boiling ketones, such as acetone and in castor oil. The resins of this invention are substantially stable but are usually not completely saturated. However, it is within the scope of this invention to hydrogenate the polymerized hydrocarbon diene units to decrease the unsaturation. Where desired, hydrogenation may be continued to substantially complete saturation. When hydrogenated, the melting or softening point of the resin is increased by from about 20° to about 30° C. When boron trifluoride is used as a catalyst, the resins obtained are particularly easy to hydrogenate since the adverse effects of catalyst residues which occur when non-volatile Friedel-Crafts reagents are used, are not encountered. As a result, unsaturated hydrogenated resins are readily obtained, hydrogenation time may be reduced and catalyst life lengthened.

Hydrogenation can be carried out by subjecting the resins (after polymerization and when in solution) in an inert solvent hereinbefore-described, or in the molten state, to hydrogen in the presence of a hydrogenation catalyst. Suitable hydrogenated catalysts are noble metal catalysts, such as platinum, platinum oxide, palladium, palladium oxide, and the like and base metal catalysts such as finely divided nickel, nickel-copper, activated Raney nickel, etc. Utilizing noble metal catalysts, for example, the resin may be subjected to hydrogenation at a pressure of about 1 atmosphere at a temperature between about 10° C. and about 40° C. for from about two to about sixteen hours. Alternatively, when a base metal catalyst such as activated Raney nickel catalyst is used, the resins can be subjected to hydrogenation at a pressure between about 200 and about 1000 pounds per square inch at a temperature between about 120° C. and about 200° C. for a period of from about 30 minutes to about six hours. An advantageous procedure for hydrogenating resins involves treating a solution of the resins in the solvent suitable for both polymerization and hydrogenation (for example, methylcyclohexane) with the polymerized catalyst, removing the catalyst after the resin is formed, and then hydrogenating the resin.

The following specific examples are intended to illustrate the invention, but not to limit the scope thereof, parts and percentages being by weight unless otherwise specified.

Example 1.—Preparation of a dipentene-carvestrene feed stock from $\Delta$-3-carene A glass column 1 inch by 23 inches was packed with 95 grams of grade F1, 5–8 mesh, activated alumina supplied by the Aluminum Company of America. The column was equipped with a heater, and 820 ml. of $\Delta$-3-carene was passed therethrough at varying rates at a temperature of between about 300° C.–310° C. to give a product which analyzed by vapor phase chromotography at 41.7% $\Delta$-3-carene, 31% dipentene and carvestrene and 27.3% other hydrocarbons. The mixture was fractionally distilled and the cuts combined to give 115 grams of a product consisting substantially of 50–50 dipentene-carvestrene.

Example 2.—Preparation of dipentene-carvestrene resin

A mixture of 26.2 parts of the dipentene-carvestrene product obtained in Example 1 and 93.5 parts of methylene dichloride was chilled to a temperature of $-20°$ C. Boron trifluoride was then slowly bubbled into the mixture while the mixture was vigorously agitated with a mechanical stirrer and cooled in a cooling bath to prevent rise in temperature. The temperature rose rapidly to about $+10°$ C. and was then reduced to $-10°$ C. by the cooling bath. The reaction appeared to be substantially complete in a few minutes as indicated by the initial temperature rise. However, boron trifluoride was added continuously until no more appeared to be absorbed and the reaction mixture was agitated at about $-10°$ C. for about three hours. The resin formed in the reaction mixture took the form of a gel which behaved as a slurry under agitation. The mixture was then washed with two volumes of water which raised the temperature of the solvent to above 0° C. and at the same time removed the catalyst. The water wash was consequently followed by a wash with 5% aqueous sodium hydroxide and a further wash with distilled water. The resin was then recovered from the dispersion by stirring in thereto a large volume of methyl alcohol. Twenty one and four tenths parts of white resin having a softening point (ring and ball method) of 134° C. and a molecular weight of 2700, as determined by the depression of the freezing point of benzene, were obtained. One percent of the resin in benzene had a viscosity of 1.081 times the viscosity of the benzene.

Example 3.—Preperation of dipentene-carvestrene-$\beta$-pinene resin

A mixture consisting of 13.1 parts of the dipentene-carvestrene liquid obtained by the procedure of Example 1 and 13.1 parts of $\beta$-pinene and 93.5 parts of methylene dichloride was chilled to a temperature of $-40°$ C. Boron trifluoride was then slowly bubbled into the mixture while the mixture was vigorously agitated and cooled to prevent undue increase in temperature. The temperature rose rapidly to 0° C. and was then brought back to approximately $-20°$ C. by the cooling bath. Boron trifluoride was thereafter added continuously until no more appeared to be absorbed. Agitation of the reaction mixture was continued while the temperature was held to about −20° C. for about three hours. The resin formed in the reaction mixture took the form of a gel which behaved thixotropically as a slurry during agitation. The mixture was then washed with water as in Example 2 which was followed by a wash with 5% aqueous sodium hydroxide and a pure water wash also as in Example 2. Twenty three and five tenths parts of a resin having a softening point of 134° C. (ring and ball method) and having a molecular weight of about 3000 were obtained.

Example 4.—Preparation of dipentene-carvestrene-piperylene resin

The process of Example 3 was repeated except that a mixture of 13.1 parts of the dipentene-carvestrene liquid, prepared substantially identical as that of Example 1, and 13.1 parts of piperylene and 93.5 parts of methylene dichloride was employed in place of the mixture employed in Example 3. A resin having a softening point of 144° C. was obtained in a yield of 92%, based on the mixture charged. The resin was light amber and transparent and had a molecular weight of about 2500.

Example 5.—Preparation of dipentene-carvestrene resin

Twenty-six and two tenths parts of a feed stock containing 90% by weight of a mixture of dipentene-carvestrene in a weight ratio of 1:1 was added with vigorous stirring to 22.6 parts of liquid toluene containing 1.3 grams of aluminum chloride. The toluene was cooled, prior to the addition of the feed stock, to 0° C. and the feed stock was added to the toluene at a rate such that a temperature in the range of 0° to 5° C. could be maintained during the addition. The resultant mixture was permitted to warm to about 20° C. over a period of one hour after which it was quenched with an equal volume of 20% aqueous NaOH. The aqueous layer was separated and the toluene solution of the resin was washed twice with equal volumes of water after which residual water and solvent were distilled from the resin. The resin had a color of WG to WW (Rosin Scale) and a softening point of 125° C. The total yield of resin was 24.1 representing a yield of 92%, based on the weight of the feed stock employed.

Example 6.—Preparation of dipentene-carvestrene-β-pinene resin

The procedure of the preceding example was repeated except that the feed stock consisted of a mixture of 13.1 parts of the dipentene-carvestrene mixture employed in Example 5 and 13.1 parts of β-pinene. A similarly colored resin having a softening point of 130° C. was obtained in a 90% yield.

Example 7.—Comparison of the softening points of dipentene-carvestrene and other terpene resins Terpene resins including dipentene-carvestrene resins containing the ingredients in the amounts of the table set forth below were prepared in accordance with the procedure of Example 5.

| Resin No. | Feed stock ingredients | Amount, percent | Softening point of resin (° C.) |
| --- | --- | --- | --- |
| 1 | Dipentene | 100 | 92 |
| 2 | Dipentene-carvestrene [1] | 100 | 147 |
| 3 | do [2] | 100 | 125 |
| 4 | Dipentene-carvestrene [1] | 50 | 134 |
|   | β-Pinene | 50 | 134 |
| 5 | Dipentene-carvestrene | 10 | 140 |
|   | β-Pinene | 90 | 140 |
| 6 | Dipentene-carvestrene [2] | 80 | 169 |
|   | Piperylene | 20 | |

[1] Obtained from the pyrolysis of Δ-3-carene and having a dipentene-carvestrene weight ratio of 1:1.
[2] Obtained by heating isoprene at 30° C. and having a dipentene-carvestrene weight ratio of 1:0.66.

From the foregoing, it can be seen that the resins containing dipentene and carvestrene have generally higher softening points than resins which do not contain these materials.

The dipentene-carvestrene containing resins described in Examples 1 through 7 were incorporated in standard adhesive formulations and evaluated as to adhesion and tackifying properties. These properties were compared with adhesive formulations which were identical in all respects, except that they contained poly-β-pinene in each instance. The resin compositions containing the dipentene-carvestrene components were equal to or better than poly-β-pinene resins with respect to adhesive and tackifying properties.

It will be evident from Example 7 that the resins of this invention can be considered as improved and/or extended β-pinene resins. However, resin number two of Example 7 comprising polymerized dipentene-carvestrene feed stock is superior per se to poly-β-pinene.

In essence then, about 10–100 weight percent of the resin consists essentially of dipentene and carvestrene, in the dipentene:carvestrene weight ratio between about 1:0.66 to about 1:10, and the resin can also have polymerized into its structure 0 to about 90 weight percent of β-pinene and/or piperylene.

What is claimed is:

1. A resin composition consisting essentially of polymerized unsaturated hydrocarbon diene units taken from groups (a) and (b) below:
  (a) a mixture of dipentene and carvestrene in a dipentene-carvestrene weight ratio of between about 1:0.66 and about 1:10, and
  (b) from about 0 to about 90 weight percent of a hydrocarbon selected from the group consisting of β-pinene, piperylene, and mixtures thereof, said resin composition having a drop melting point above about 120° C.

2. The resin composition of claim 1 containing from about 10 to about 50 weight percent of β-pinene.

3. The resin composition of claim 1 containing from about 10 to about 50 weight percent of piperylene.

4. The resin composition of claim 1 containing from about 25 to about 75 weight percent of a mixture of substantially equal parts of β-pinene and piperylene.

5. The resin composition of claim 1 wherein the dipentene:carvestrene weight ratio is between about 1:1 and 1:10.

6. The resin composition of claim 5 containing from about 40 to about 60 weight percent of β-pinene.

7. The resin composition of claim 5 containing from about 10 to about 50 weight percent of piperylene.

8. A resin composition of claim 1 wherein the mixture of dipentene and carvestrene is derived from a Δ-3-carene pyrolizate.

9. The resin of claim 8 containing from about 40 to about 60 weight percent of β-pinene.

10. The resin of claim 8 containing from about 10 to about 50 weight percent of piperylene.

References Cited

UNITED STATES PATENTS

| 2,391,293 | 12/1945 | Carmody | 260—93.3 |
| 2,391,359 | 12/1945 | Spurlin | 260—93.3 |
| 2,814,610 | 11/1957 | Braidwood | 260—93.3 |

OTHER REFERENCES

Chemical Abstracts, vol. 53; 1405 f, Δ$^3$-Carene Polymers.

JOSEPH L. SCHOFER, Primary Examiner

ROGER S. BENJAMIN, Assistant Examiner

U.S. Cl. X.R.

260—80.78, 82, 88.2